US008775769B2

(12) United States Patent
Li et al.

(10) Patent No.: US 8,775,769 B2
(45) Date of Patent: Jul. 8, 2014

(54) PARTITION-BASED METHOD AND APPARATUS FOR DIAGNOSING MEMORY LEAK IN JAVA SYSTEMS

(75) Inventors: Ying Li, Beijing (CN); Quan Long, Cambridge (GB); Tiancheng Lui, Beijing (CN); Jie Qiu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 808 days.

(21) Appl. No.: 12/165,678

(22) Filed: Jul. 1, 2008

(65) Prior Publication Data
US 2009/0037687 A1 Feb. 5, 2009

(30) Foreign Application Priority Data
Jul. 4, 2007 (CN) .......................... 2007 1 0126984

(51) Int. Cl.
| G06F 12/00 | (2006.01) |
|---|---|
| G06F 13/00 | (2006.01) |
| G06F 13/28 | (2006.01) |
| G06F 9/44 | (2006.01) |
| G06F 9/45 | (2006.01) |

(52) U.S. Cl.
USPC ........... 711/173; 717/127; 717/128; 717/130; 717/131; 717/132; 717/133; 717/151; 717/154; 717/157; 717/158; 717/152; 717/153

(58) Field of Classification Search
None
See application file for complete search history.

(56) References Cited

U.S. PATENT DOCUMENTS

| 6,275,916 | B1 | 8/2001 | Weldon | |
|---|---|---|---|---|
| 6,370,684 | B1 * | 4/2002 | De Pauw et al. | 717/124 |
| 7,310,718 | B1 * | 12/2007 | Liang et al. | 711/170 |
| 2004/0078540 | A1 * | 4/2004 | Cirne et al. | 711/170 |
| 2005/0076184 | A1 | 4/2005 | Schumacher | |
| 2007/0027942 | A1 * | 2/2007 | Trotter | 707/205 |
| 2007/0088915 | A1 * | 4/2007 | Archambault et al. | 711/137 |

OTHER PUBLICATIONS

Partition-based Heap Memory Management in an Application Server ACM SIGOPS Operating Systems Review archive vol. 42 Issue 1, Jan. 2008 pp. 98-98.*
JPAR—Isolating Java Heap to Protect Runtime of Middleware from Memory Leak Shu Shi, Ying Li, Kewei Sun, Ying Chen IBM China Research Laboratory, 2006 11 pages.*
shu shi CV showing work on JPAR in 2006 2 pages.*
Czajkowski, G., et al, "Multitasking without compromis: a virtual machine evolution", OOPSLA, Nov. 2001.
Back, G., et al, "Processes in KaffeOS: Isolation, resource management, and sharing in Java", Proceedings of the Fourth Symposium on OSDI, 2000.

(Continued)

Primary Examiner — Sanjiv Shah
Assistant Examiner — Marwan Ayash
(74) Attorney, Agent, or Firm — William Stock; Anne Vachon Dougherty

(57) ABSTRACT

A partition-based method for diagnosing memory leaks in Java systems, comprising dividing heap memory of a Java virtual machine into a plurality of partitions based on a partition plan, wherein each partition has at least one partition owner; monitoring the status of the respective partitions to determine whether there is a partition in which the memory space is exhausted; and if there is a partition in which the memory space is exhausted, determining that the memory leak may occur in the partition and analyzing the partition to obtain leaked objects and objects related to the leaked objects. The present invention also provides a partition-based apparatus for diagnosing memory leak in Java systems.

12 Claims, 6 Drawing Sheets

(56) References Cited

OTHER PUBLICATIONS

Shaham, R., et al, "Automatic removal of array memory leaks in Java", Compiler Construction, 9th International Conference, vol. 1781, pp. 50-66, Germany, Mar. 2000.

Chilimbi, T., et al, "Low-overhead memory leak detection using adaptive statistical profiling", Proceedings on the Symposium on ASPLOS, Oct. 2004.

Mitchell, N., et al, "An Automated and Lightweight Tool for Diagnosing Memory Leaks in Large Java Applications", ECOOP, Jul. 2003.

* cited by examiner

PARTITION-BASED METHOD AND APPARATUS FOR DIAGNOSING MEMORY LEAK IN JAVA SYSTEMS

TECHNICAL FIELD OF THE INVENTION

The present invention relates to a diagnosis technology of memory leaks in Java systems, specifically to a partition-based method and apparatus for diagnosing memory leaks in Java systems.

BACKGROUND OF THE INVENTION

A significant advantage of a Java system is that the reclamation of memory is managed automatically by a garbage collector and programmers do not need to release the memory by calling a function. The memory management in Java refers to the allocations and releases of objects. In Java, it is required that memory space is requested for each object through programs. And the spaces are allocated for all the objects in the heap memory and the releases of objects are decided and performed by the garbage collector. Given that, in Java, the allocation of memory is performed by programs and the release of the memory is performed by the garbage collector. In this way, the programmers do not need to worry about the problem of the release of memory.

However, a Java program may inadvertently maintain references to some objects which are no longer used, preventing the garbage collector in the Java system from reclaiming the memory space occupied by these objects, which causes so-called "Memory Leak". Memory leak will lead to degraded performance of the Java system, and at worst to programs being incapable of running or the system crashing. For example, an investigation of customers of IBM J2EE electronic business software revealed that production systems frequently crash because of memory leaks. Thus, it becomes very important to diagnose the memory leaks in Java systems, i.e. finding out the related classes, and methods, etc.

In the prior art, there are several memory leak-related methods as follows:

1. The first method: memory accounting and controlling for tasks, which may prevent one task from exhausting the whole memory during runtime. In a multitask virtual machine (MVM), each task has a guaranteed amount of memory. A Kaffe operating system (KaffeOS) accounts for CPU and memory on a per-process basis to limit the consumption. By accounting and controlling memory consumption, the task or process with leaking logic cannot monopolize the whole heap memory even in the presence of memory leaks. This method may improve the availability of running applications in the presence of memory leaks, but it can neither identify the reason for a memory leak nor help the user find out the memory leak-related source code. The details of the above method and KaffeOS are detailed in "Multitasking without compromise: a virtual machine evolution", published by Czajkowski, G. and Dayn es, L., Object-Oriented Programming, Systems, Languages, and Applications (OOPSLA'01), November 2001; and "Processes in KaffeOS: Isolation, resource management, and sharing in Java", published by G. Back, W. Hsieh, and J. Lepreau, Proceedings of the Fourth Symposium on Operating System Design and Implementation (OSDI'2000), San Diego, Calif., USA, 2000.

2. The second method: static or profile-based analysis on source code according to some characteristics and rules to find out potential memory leak. Now, developers have conducted a lot of research on such method. For example, please refer to: "Automatic removal of array memory leaks in Java", published by R. Shaham, E. K. Kolodner, and M. Sagiv, D. A. Watt, Editor, Compiler Construction, $9^{th}$ International Conference, Volume 1781 of Lecture Notes in Computer Science, pages 50-66, Berlin, Germany, March 2000; and "Low-overhead memory leak detection using adaptive statistical profiling", published by T. Chilimbi and M. Hauswirth, Proceedings of the Symposium on Architectural Support for Programming Languages and Operating Systems (ASPLOS), October 2004.

However, memory leak in Java is actually semantic related. Accordingly, the definitions of characteristics and rules are quite hard, and improper definitions will result in inaccurate reports. Further, without stressing on the temporal order of method object invocations, it is hard to determine whether a variable refers to a leaked object or not.

3. The third method: runtime information-based approaches, which analyzes the snapshots of heap memory to pick out candidates of leaked objects. The details may be referred to: "LeakBot: An Automated and Lightweight Tool for Diagnosing Memory Leaks in Large Java Applications", published by Nick Mitchell and Gary Sevitsky, European Conference on Object-oriented Computing (ECOOP), July 2003. However, such approaches tend to yield large amounts of low-level information about individual objects that require a lot of analysis time and knowledge of applications, and cannot help the user find out the memory leak-related source code.

SUMMARY OF THE INVENTION

The present invention is set forth based on the above technical problems and its aim is to provide a partition-based method and apparatus for diagnosing memory leaks in Java systems. It is straightforward and fast for the invention to diagnose a memory leak in a Java system, and it prevents system crash due to a memory leak, finds out the memory leak related source code, and facilitates the repair of the memory leak.

According to one aspect of the present invention, a partition-based method is provided for diagnosing a memory leak in Java systems, comprising: dividing a heap memory of a Java virtual machine into a plurality of partitions based on a partition plan, wherein each partition has at least one partition owner; detecting the status of the respective partitions to determine whether there is a partition in which the memory space is exhausted; and if so, determining that the memory leak may occur in the partition and analyzing the partition to obtain leaked objects and objects related to the leaked objects.

According to another aspect of the present invention, a partition-based apparatus is provided for diagnosing a memory leak in a Java system, comprising: a partitioning unit for dividing a heap memory of a Java virtual machine into a plurality of partitions based on partition plan, wherein each partition has at least one partition owner; a detector for detecting the status of the respective partitions to determine whether there is a partition in which the memory space is exhausted; and an analyzer for analyzing the partition in which the memory space is exhausted to obtain leaked objects and objects related to the leaked objects.

DETAILED DESCRIPTION OF THE INVENTION

It is believed that the above and other objectives, characteristics and advantages of the present invention will become apparent through the following detailed descriptions of the concrete implementations of the present invention accompanying the drawings.

Figure 1:
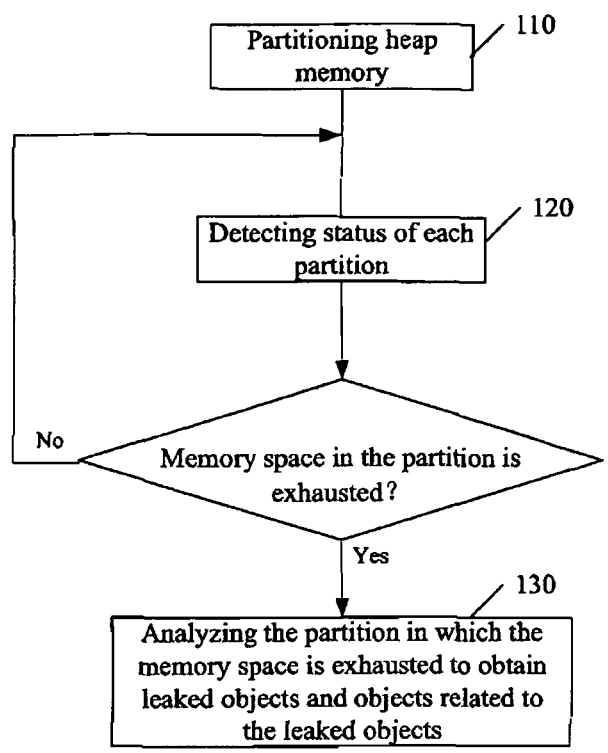
FIG. 1 is a flowchart of a partition-based method for diagnosing memory leak in Java systems according to one embodiment of the present invention.

FIG. 1 is a flowchart of a partition-based method for diagnosing a memory leak in a Java system according to one embodiment of the present invention.

As shown in FIG. 1, firstly at Step 110, a heap memory of a Java virtual machine is divided into a plurality of partitions according to a partition plan, wherein each partition has at least one partition owner.

A partition plan is a profile for defining partition owners and correspondingly defining the partitions and the sizes of them. Accordingly, the partition plan includes at least a partition owner and the size of the partition. As a partition owner of a partition, all the objects created by it are allocated within the partition.

The partition plan may be generated by the user in advance, and may also be determined by analyzing the application source code. The particular method of generating a partition plan will be described in detail in the following embodiments.

In this way, the heap memory in a Java virtual machine may be partitioned based on the partition plan. The particular partition method of the heap memory in a Java virtual machine will be described in detail in the following embodiments.

Then, at Step 120, the status of the respective partitions is monitored to determine whether there is a certain partition in which the memory space is exhausted. The utilization condition of each partition may be known by monitoring the status of the partition. When the memory space of a partition is to be exhausted, an OutOfMemoryError signal will be generated in response to the object allocation request to the partition. As a result, whether there is a partition in which the memory space is exhausted may be known by detecting whether this signal appears.

If there is a partition in which the memory space is exhausted, it is determined that there may be a memory leak in the partition. Then, at Step 130, the partition is further analyzed to obtain leaked objects and objects related to the leaked objects. For example, LeakBot in the existing tools may be used to analyze the partition.

In this embodiment, a leaked object is the object that is referenced long after it is needed in the case of memory leak. The objects related to the leaked objects include the objects which reference the leaked objects directly or indirectly and/ or the objects which create the leaked objects.

If there is no partition in which the memory space is exhausted, the Step 120 is repeated.

It can be seen from the above description that the partition-based method for diagnosing memory leak in Java systems may diagnose whether there exists a memory leak in a Java system directly and quickly, by partitioning the heap memory in a Java virtual machine and monitoring whether the memory space of the partitions is exhausted; and moreover, the memory leak in a certain partition may not influence the running of other partitions by partitioning the heap memory, so that the whole Java virtual machine is capable of keeping running.

Figure 2:
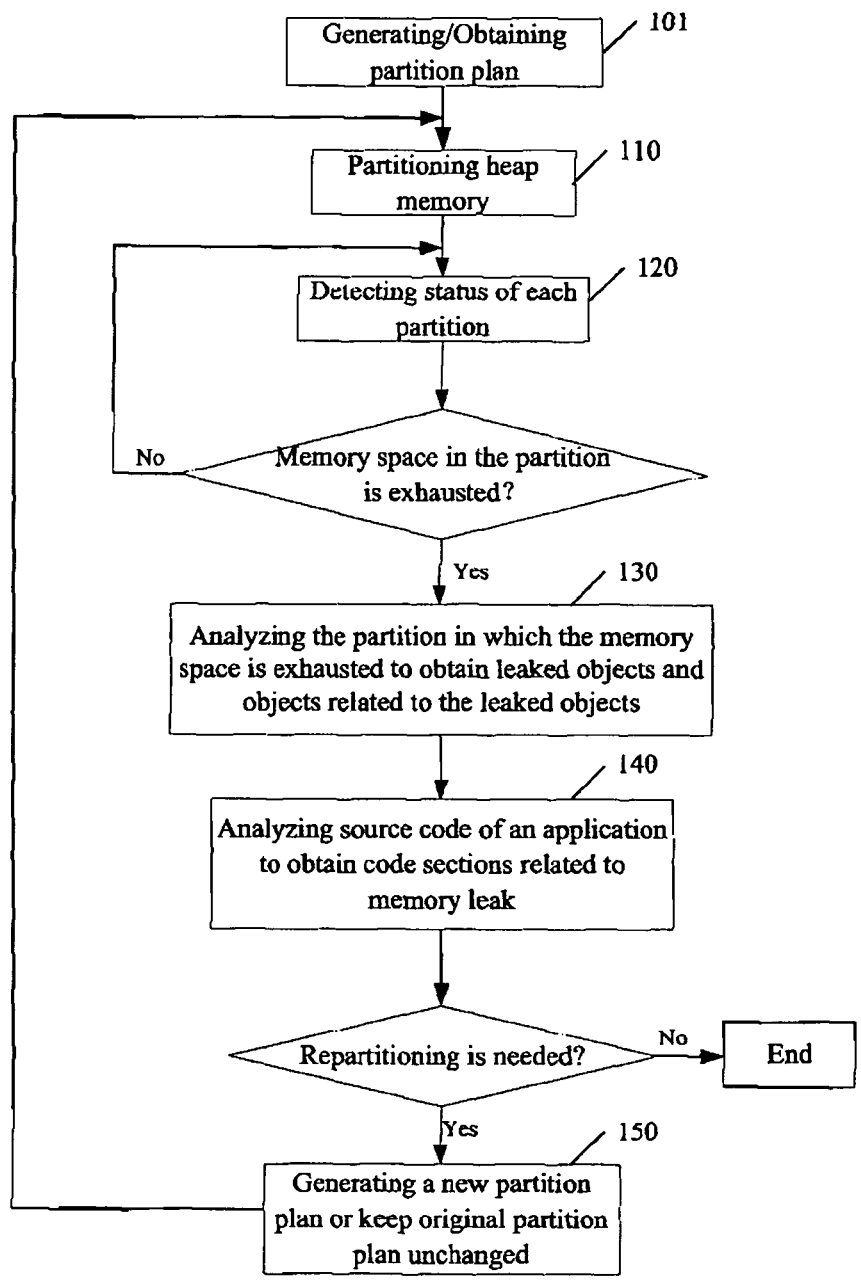
FIG. 2 is a flowchart of a partition-based method for diagnosing memory leak in Java systems according to another embodiment of the present invention.

FIG. 2 is a flowchart of a partition-based method for diagnosing a memory leak in a Java system according to another embodiment of the present invention. As follows, this embodiment will be described in detail in connection with the drawing.

As shown in FIG. 2, at first at Step 101, a partition plan of the heap memory in a Java virtual machine is generated or acquired. As stated above, the partition plan is a profile for defining partition owners and correspondingly defining the partitions and the sizes of them. Accordingly, the partition plan includes a set of partitions each of which has at least one partition owner and a size of that partition. As a partition owner of a partition, all the objects created by it are allocated within the partition. The partition owner may be a package, a class, a method, or the like in Java.

The partition plan may be generated by the user in advance according to the objective. Generally, a partition is defined based on the logic structure of an application. For example, in a J2EE application, each Servlet and EJB (Enterprise JavaBeans) may be defined as a partition owner and accordingly all the objects created by these partition owners are allocated within the corresponding partitions. Then, the sizes of the respective partitions may be determined according to the obtained behaviors of the partition owners. Since the respective behavior of each partition owner greatly impacts the memory space it uses, a set of test runs is necessary to determine an appropriate partition size.

Alternatively, the partition plan may also be generated by analyzing the source code of the application. In particular, firstly the potential relationships among all the objects regarding a memory leak in the source code of the application are obtained by performing escape analysis on the source code of the application. Commonly, an object escapement means its lifetime exceeds the object which creates the same, such as a thread, or a method. The formal definition about the escapement of an object may be referred to: "Escape analysis for Java" written by J. Choi, M. Gupta, M. Serrano, V. Sreedhar, and S. Midkiff, In Object-Oriented Programming, Systems, Languages and Applications, 1999. The cause of object escapement is that there is some other object which has not been created in the object holding a reference to the target object. Then, according to the result of the escape analysis, the distances between every two objects are calculated. And according to the calculated distances, all the objects are clustered into a plurality of groups and each group is allocated with one memory space, i.e. one partition. In this embodiment, clustering may be a Spectral Clustering method, which may be referred to "On Spectral Clustering: Analysis and an Algorithm", written by A. Y. Ng, M. Jordan, and Y. Weiss, In Advances in Neural Information Processing Systems, 2001. Finally, the partition owner and the size of each partition are determined based on the objects contained in each partition.

The partition plan is described as follows by means of particular examples.

EXAMPLE 1

An example of a partition plan defining a partition owner at method level is shown. The partition plan shown as below defines a partition named "HelloPar" with 10K in size, whose owner is a method say(String) of class com.ibm.jpar.runtime.test.HelloWorld.

```
<partition>
    <name>HelloPar</name>
    <size>10000</size>
    <methods>
        <class-name>com.ibm.jpar.runtime.test.HelloWorld</class-name>
        <method-name>say</method-name>
        <method-params>java.lang.String</method-params>
    </methods>
</partition>
```

When the application is running, at the entry of the method say(String), the thread-binding partition is switched to the partition belonged to the partition owner say(String).

EXAMPLE 2

An example of a partition plan of a partition having a plurality of partition owners is shown. The partition plan shown as below defines a partition with two partition owners. One partition owner thereof is a method say(String) of class com.ibm.jpar.runtime.test.HelloWorld; and the other partition owner is a method echo of class com.ibm.jpar.runtime.test.HelloWorld.

```
<partition>
    <name>HelloEchoPar</name>
    <size>20000</size>
    <methods>
        <class-name>com.ibm.jpar.runtime.test.HelloWorld</class-name>
        <method-name>say</method-name>
        <method-params>java.lang.String</method-params>
    </methods>
    <methods>
        <class-name>com.ibm.jpar.runtime.test.Echo</class-name>
        <method-name>echo</method-name>
        <method-params>java.lang.String</method-params>
    </methods>
</partition>
```

Example 3

An example of a partition plan defining a partition or a partition owner at class level is shown. To defining a partition or a partition owner at a higher level, for example, at a class level, a wildcard (*) should be used. The partition plan shown as below defines a partition whose partition owner is class com.ibm.jpar.runtime.test.HelloWorld.

```
<partition>
    <name>HelloPar</name>
    <size>15000</size>
    <methods>
        <class-name>com.ibm.jpar.runtime.test.HelloWorld</class-name>
        <method-name>*</method-name>
        <method-params>*</method-params>
    </methods>
</partition>
```

Return to FIG. 2. After the partition plan is generated or acquired (Step 101), the heap memory in the Java virtual machine may be divided into a plurality of partitions according to the partition plan (Step 110).

Figure 3:
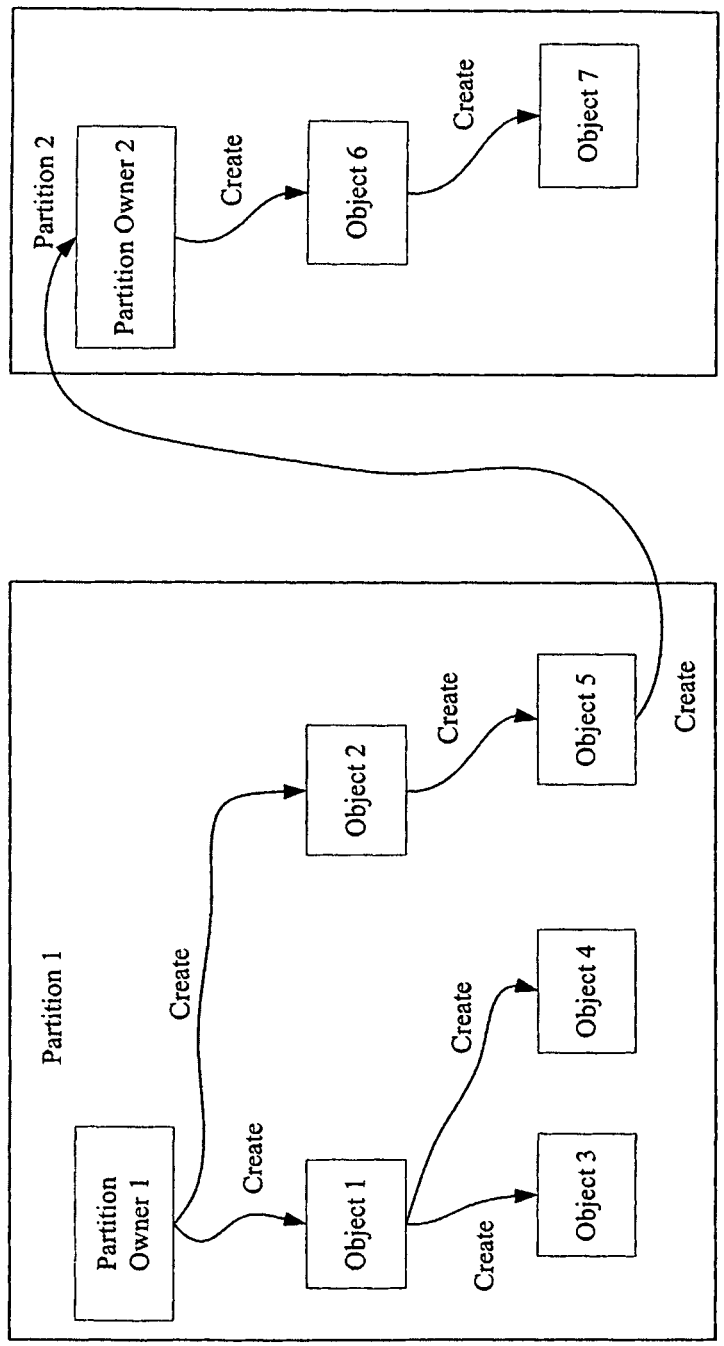
FIG. 3 is a schematic diagram showing two partition owners.

For example, if the partition plan is a thread-binding plan, the partition is the thread-binding memory space, the partition owner is the thread, and all the objects created by the respective threads are allocated in the thread-binding partition. If, when the application is running, the current thread executes a method of another partition owner, the thread-binding partition and the partition owner will change. FIG. 3 is a schematic diagram showing two partition owners. As shown in FIG. 3, the heap memory in the Java virtual machine is divided into two partitions: Partition 1 and Partition 2. Partition Owner 1 of Partition 1 creates 5 objects which are all allocated in Partition 1. Object 5 in Partition 1 creates Partition Owner 2 of Partition 2 and the thread-binding partition is switched to Partition 2. Partition Owner 2 creates 2 objects which are both allocated in Partition 2.

Two methods of implementing the partitioning of heap memory are described in detail as follows. Certainly, it is known for persons having ordinary skill in the art that other methods of implementing the partitioning of heap memory may also be used.

Implementation 1: J9 Virtual Machine Memory Space Based Implementation

Figure 4:
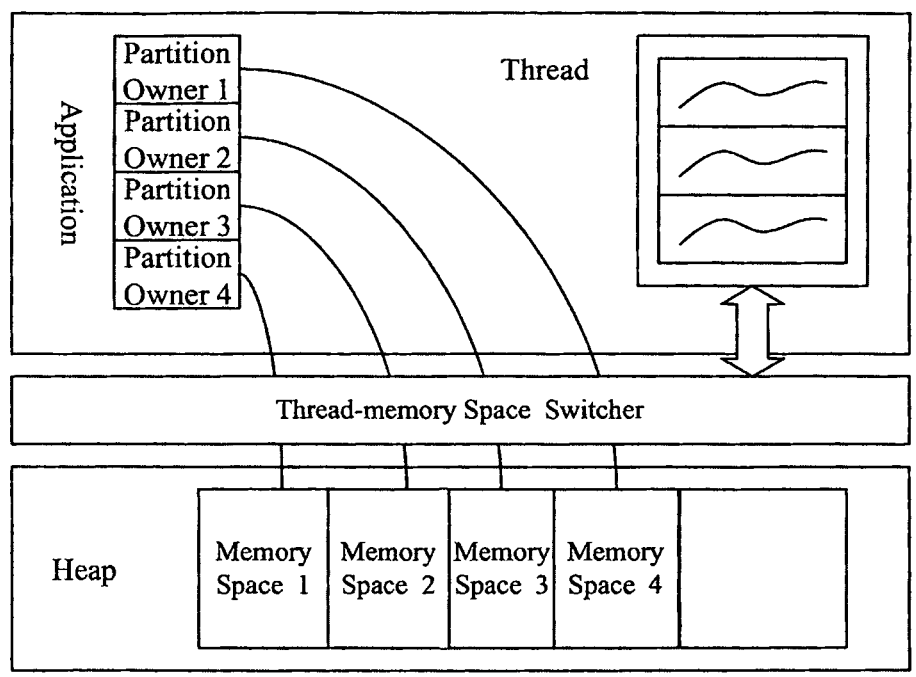
FIG. 4 is a schematic diagram of the structure of partition based on J9 virtual machine memory space.

FIG. 4 is a schematic diagram of the structure of a partition based on J9 virtual machine memory space. The mechanism of the J9 virtual machine memory space fits well to partition the heap memory. The memory space, as the unit of heap memory assignment, manages physical memory directly to cope with the requests of object allocation. One memory space cannot use any physical memory of other memory spaces. The resource management class library in J9 virtual machine, jclRM, exposes APIs of memory space for developers to do some basic management operations, including memory space creation, destruction, etc.

As shown in FIG. 4, in the partition structure there are 4 partition owners, which are threads. As stated in the above, the partition plan defines the partition owners and the sizes of the corresponding memory spaces (partitions). Accordingly, the memory space (partition) corresponding to the respective partition owner is created respectively, with the size defined in the partition plan, at the startup time of the application via resource management class library, jclRM, by invoking createMemorySpace method. In this way, each thread is associated with a memory space and all the objects created by a thread will be allocated in the memory space associated with the thread.

In the structure shown in FIG. 4, there also exists a thread-memory space switcher (TMSS) between the threads and the corresponding memory spaces (partitions) of the application. The TMSS includes a component which instruments the class loaded in the Java virtual machine. The instrumented code can switch the thread-binding memory space via the interface provided by resource management class library, jclRM, by invoking setCurrentMemorySpace method. Each time the execution path of the application crosses the boundary between one partition owner and another one, the TMSS triggers the instrumented code to switch the thread-binding memory space.

Therefore, the workflow at the application runtime is shown as follows: at first starting the application; reading the partition plan and creating memory spaces for each partition owner in the partition plan as a partition; next, instrumenting the classes of the partition owners and inserting the thread-binding memory space code; and then invoking the main method of the application. When the application ceases, all the memory spaces may be destroyed also via the resource management class library jclRM interface by invoking destroyMemorySpaces method.

Implementation 2: Java Virtual Machine Tool Interface Based Implementation

The Java virtual machine tool interface (JVM TI) is a programming interface used by development and monitoring tools. It may inspect the state of an application running in the Java virtual machine and control the execution of the application. Furthermore, the JVM TI provides a set of heap interfaces allowing operation with objects at runtime.

The JVM TI allows objects to be associated with a value (tag), which may be set by using the SetTag method or by a callback method such as jvmtiHeapObjectCallback. In this way, the partition of the heap memory may be implemented by using tags. At first, each partition is provided with an identifier ID so that it is represented that an object belongs to a certain partition only if the object is set with a tag of the partition ID of the partition.

Figure 5:
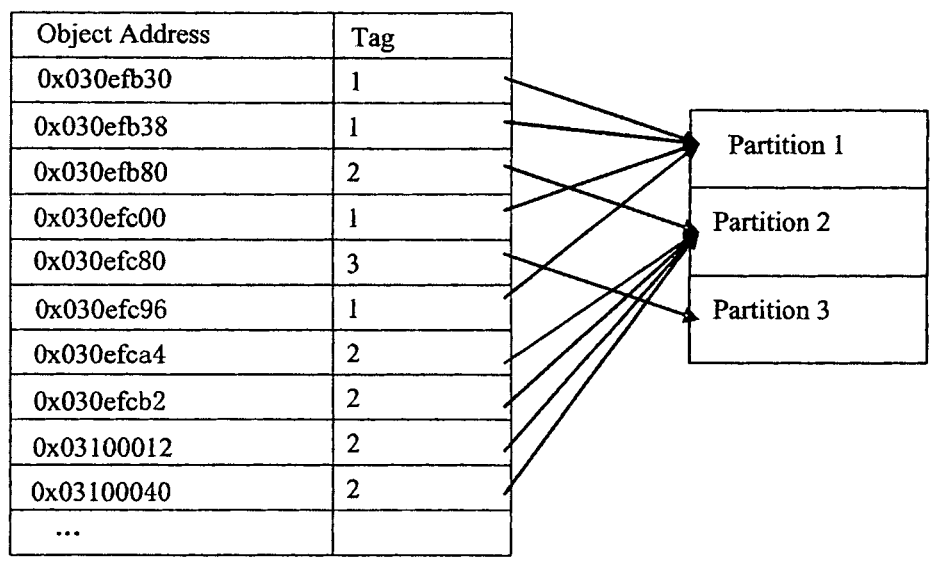
FIG. 5 is a schematic diagram showing a partition of a heap memory implemented by JVM TI tags.

When the application is running, the objects in a partition of the heap memory might not be within a continuous memory space and must be aggregated by the tags. FIG. 5 is a schematic diagram showing partitions of heap memory implemented using JVM TI tags. As shown in FIG. 5, the object addresses corresponding to the tag with value 1 belong to Partition 1, the object addresses corresponding to the tag with value 2 belong to Partition 2, and the object addresses corresponding to the tag with value 3 belong to Partition 3, although the object addresses are not continuous in the same partition.

The used size of the partition may be acquired via the JVM TI interface by invoking GetObjectsWithTags method to obtain all the objects in the partition and their sizes.

Therefore, the thread-binding partitions of the Java virtual machine tool interface based implementation may be implemented by the following steps: when the application is running, dynamically creating partitions with identifiers IDs so that each thread has a thread-binding partition; and each time an object is allocated, tagging the object with the partition ID of the corresponding thread-binding partition. Further, the thread-binding partition may be changed at runtime by invoking setCurrentPartition method.

In addition, the JVM TI may also track the object allocation, which may be implemented by byte code instrumentation. The byte code instrumentation may be used to track the object allocation in byte code. When an object is created, an event callback function VMObjectAlloc is invoked so that the allocation cannot be detected by other instrumentation mechanisms.

Moreover, it is apparent for persons having ordinary skill in the art that other methods may be used to implement the partitioning of heap memory in addition to the above two. In fact, any method for implementing the partitioning of heap memory is possible as long as the following two points are satisfied: (1) recording the one-to-many relations between the partition and the objects; and (2) acquiring the sizes of all the objects in a partition and totalling them to obtain the size of the partition. For example, a two-dimension table may be used to maintain the relations between the partition and the objects, which comprises in particular: intercepting the object allocation by byte code instrumentation; then determining the corresponding partition of the allocated object according to the invoking stack of the current thread and updating the corresponding entry of the two-dimension table; finally, obtaining the size of the object and updating the size of the corresponding partition via the interface provided by the Java language.

Returning to FIG. 2, then at Step 120, the status of the respective divided partitions are monitored to determine whether there is a partition in which the memory space is exhausted. As stated in the above, it is possible to determine whether there is a partition in which the memory space is exhausted by detecting whether an OutOfMemoryError occurs in a certain partition.

When there is a partition in which the memory space is exhausted, it is determined that there may be a memory leak in the partition. Then, at Step 130, the partition is further analyzed to obtain leaked objects and objects related to the leaked objects. For example, LeakBot in the existing tools may be used to analyze the partition.

In this embodiment, a leaked object is the object that is referenced long after it is needed in the case of a memory leak. The objects related to the leaked objects include the objects which reference the leaked objects directly or indirectly and/or the objects which create the leaked objects.

If there is no partition in which the memory space is exhausted, the Step 120 is repeated.

Further, according to the obtained leaked objects and the objects related to the leaked objects, the source code of the application is analyzed to obtain the code segments related to the memory leak (Step 140).

In this embodiment, the method of analyzing source code is a static checking method. In particular, according to the leaked objects and the objects related to the leaked objects, the variables which reference these objects in the source code are tracked to identify the potential leaking references, i.e. to find out the expressions (including variables and fields) associated with the above leaked objects and the objects related to the leaked objects in the source code of the application, and conduct reference count analysis on them, which may be implemented through, for example, a Fixpoint iteration method. The possibility of the memory leak being caused by the object for which the reference count exists in the respective program statement of the source code is larger, then the reference corresponding to such object is identified as a leaking reference. The results of the reference count analysis may indicate which objects are more likely to be the source of memory leak and thereby narrow the scope of the leaked objects. Then, the reference patterns of the identified potential leaking references are extracted to determine a leaking reference as the source of the memory leak, i.e. performing the last visit analysis on the identified potential leaking reference, to obtain the utilization condition of the potential leaking reference. If a potential leaking reference has not been used for a long time, it is determined that the leaking reference is the source of the memory leak. Finally, the visit command of the leaking reference which is determined to be the source of the memory leak is tracked to determine the correct position where the release statement for releasing the leaking reference is added, so that the source code segments related to the memory leak are obtained.

In addition, after the source code segments related to the memory leak are obtained, it may be further determined whether repartitioning is needed. For example, it checks whether the source code segments related to the memory leak are so many that it is hard for the user to repair the source code segments at one run.

If repartitioning is needed, a new partition plan is generated according to the result of the source code analysis (Step 150). In particular, at first, except for the partition being detected in Step 120 in which the memory space is exhausted, the other partitions are combined to one partition; then the source code corresponding to the partition in which the memory space is exhausted are analyzed, and a new partition plan of the above partition in which the memory space is exhausted is generated according to the above-mentioned method for generating a partition plan by analyzing the source code, so that a new partition plan is obtained; then according to the new partition plan, the above steps of partitioning (Step 110), partition status monitoring (Step 120), partition analyzing (Step 130), and source code analyzing (Step 140) are repeated on the heap memory of the Java virtual machine. As a result, according to the new partition plan, the heap memory of the Java virtual machine may be further partitioned so as to position the memory leak more accurately.

Moreover, it is known for persons having ordinary skill in the art that the original partition plan may be kept unchanged when repartitioning is needed (Step 150), and the above steps of partitioning (Step 110), partition status monitoring (Step 120), partition analyzing (Step 130), and source code analyzing (Step 140) are repeated on the partition being detected in Step 120 in which the memory space is exhausted, so as to position the memory leak more accurately.

If repartitioning is not needed, the process of diagnosing memory leak is finished.

It can be seen from the above that the partition-based method for diagnosing memory leaks in Java systems of this embodiment has the following advantages:

1. Straightforward and fast diagnosing of a memory leak: the heap memory of the Java virtual machine is partitioned in this embodiment, and the memory leak is detected by monitoring whether the memory space of the partition is exhausted based on these partitions. Therefore, if a memory leak occurs, it is straightforward and fast to detect it.
2. Preventing the system from crashing due to a memory leak: for each partition owner can only allocate the created objects within the scope of its own partition, the memory leak in a certain partition will not impact other partitions and the whole Java virtual machine can remain operational even in the presence of memory leak.
3. It is possible to analyze the source code of the application to determine the source code sections related to the memory leak so as to facilitate the user to repair the source code in the application causing the memory leak.

Figure 6:
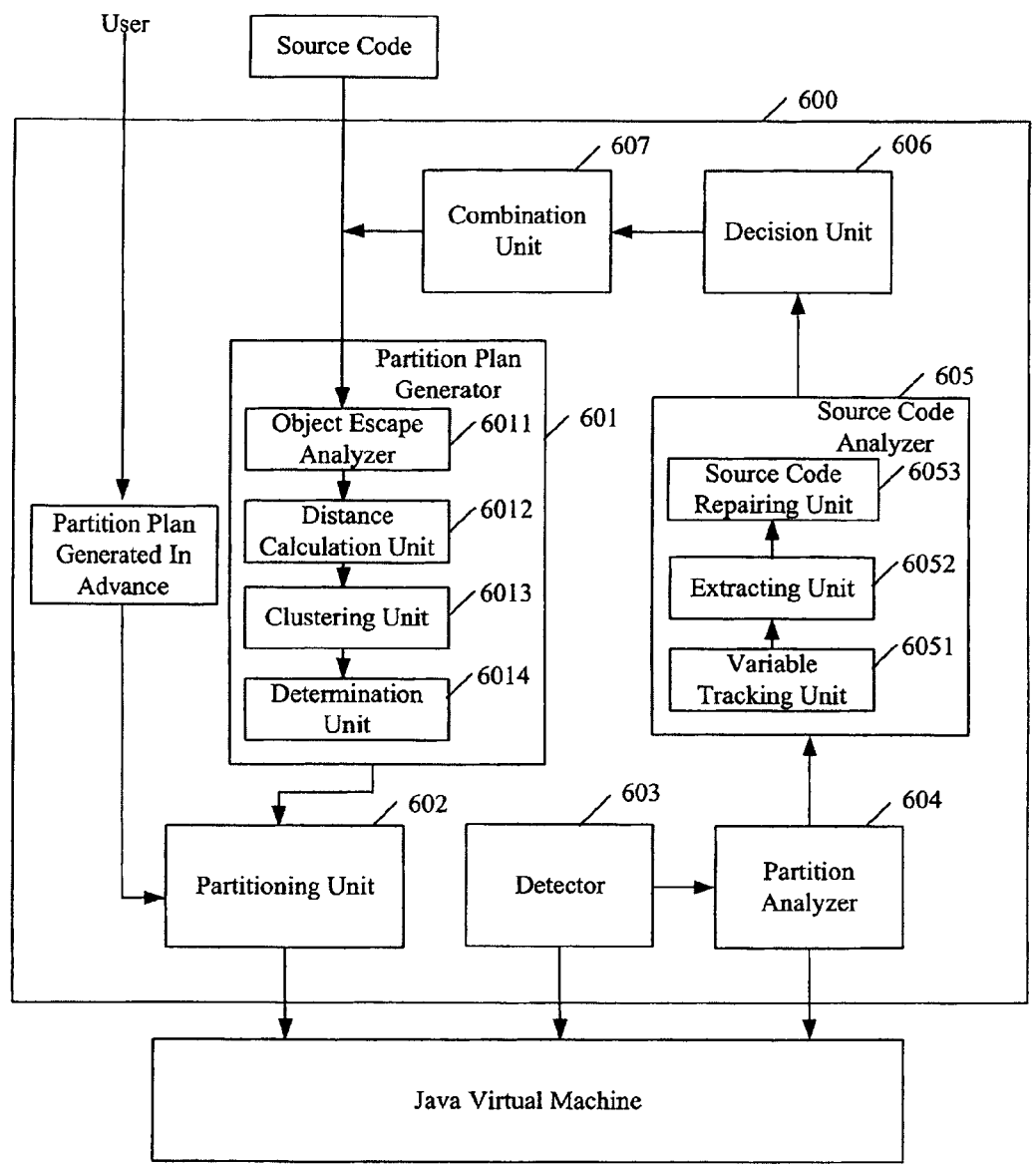
FIG. 6 is a block diagram of a partition-based apparatus for diagnosing memory leak in Java systems according to an embodiment of the present invention.

In the same inventive concept, FIG. 6 is a partition-based apparatus for diagnosing a memory leak in a Java system according to an embodiment of the present invention.

As shown in FIG. 6, the partition-based apparatus 600 for diagnosing memory leaks in Java systems in this embodiment comprises: a partition plan generator 601 for generating partition plans; a partitioning unit 602 which divides heap memory of a Java virtual machine into a plurality of partitions according to the generated partition plan, wherein each partition has at least one partition owner; a detector 603 which monitors the status of the above respective partitions to determine whether there is a partition in which the memory space is exhausted; and a partition analyzer 604 for analyzing the partition in which the memory space is exhausted to obtain leaked objects and objects related to the leaked objects.

As stated in the above, the partition plan includes at least the partition owners and the sizes of the partitions. In this embodiment, the partition plan generator 601 generates a partition plan by analyzing the source code of the application, and comprises: an object escape analyzer 6011 for performing escape analysis on the source code of the application to obtain potential relationships among all the objects in the source code; a distance calculation unit 6012 which calculates the distance between every two objects according to the analysis result of the object escape analyzer 6011; a clustering unit 6013 which clusters all the objects into a plurality of groups according to the calculated distances, wherein each group corresponds to a partition; and a determination unit 6014 for determining the owner of each partition and the size of same.

Alternatively, the partition plan may be generated by the user in advance according to the objective and is provided to the partitioning unit 602 directly. In this case, the partition plan generator 601 may be set external to the partition-based apparatus 600 for diagnosing memory leaks in Java systems, and comprises: a partition definition unit for defining partitions according to the logic structure of the application to obtain the partition owner; and a partition size determination unit for determining the sizes of the respective partitions according to the obtained partition owner's behaviors.

The partition plan generated by the partition plan generator 601 or the partition plan generated by the user in advance is provided to the partitioning unit 602 which divides the heap memory of the Java virtual machine into a plurality of partitions. In the particular implementation, if the Java virtual machine supports the partitioning function, the partitioning unit 602 may not be regarded as an individual unit; and if the Java virtual machine does not support the partitioning function, the partitioning unit 602 is connected to the Java virtual machine through the corresponding interface so as to implement the partitioning function of the heap memory.

Then, the detector 603 detects the status of the respective partitions, which is related to the utilization condition of the memory space of the partition. When the detector 603 detects that an OutOfMemoryError signal occurs in a certain partition, it is determined that the memory space of the partition will be exhausted, which represents that the memory leak may exist in the partition.

Then, the partition analyzer 604 analyzes the partition in which the memory leak may occur and obtains leaked objects and objects related to the leaked objects. For example, Leak-Bot in the existing tools may be used by the partition analyzer 604 to analyze the partition.

Further, the partition-based apparatus 600 for diagnosing memory leaks in Java systems in this embodiment further comprises: a source code analyzer 605 which analyzes the source code of the application to obtain the code segments related to the memory leak according to the leaked objects and the objects related to the leaked object obtained by the partition analyzer 604.

In particular, when the obtained leaked objects and the objects related to the leaked objects (including types) are provided to the source code analyzer 605 as input, at first a variable tracking unit 6051 tracks variables which reference these objects in the source code to identify the potential leaking references, i.e. to find out the expressions (including variables and fields) associated with the leaked objects and the objects related to the leaked objects in the source code of the application, and conduct reference count analysis on them, obtain the references corresponding to the objects for which the reference continuously exists in a series of program commands, and identify them as the potential leaking references. Then, an extracting unit 6052 extracts the reference patterns of the identified potential leaking references, i.e. performing the last visit analysis on the identified potential leaking references, to obtain the utilization conditions of the potential leaking references. If a potential leaking reference has not been used for a long time, it is determined that the leaking reference is the source of the memory leak. Then, a source code repairing unit 6053 tracks the visit command of the leaking reference which is determined to be the source of the memory leak, to determine the correct position where the release statement for releasing the leaking reference is added, so that the source code segments related to the memory leak are obtained.

Moreover, the partition-based apparatus 600 for diagnosing memory leaks in Java systems in this embodiment may further comprise: a decision unit 606 which determines if repartitioning is needed according to the analysis result of the source analyzer 605; and a combination unit 607 which combines the partitions, except the partition being monitored by the detector 603 in which the memory space is exhausted, to one partition.

If the decision unit 606 determines that repartitioning is needed, the combination unit 607 combines the partitions, except the partition being monitored by the detector 603 in which the memory space is exhausted, to one partition and then the partition plan generator 601 generates a new partition plan for the partition in which the memory space is exhausted or keeps the original partition plan unchanged and provide it to the partitioning unit 602. The partitioning unit 602 repartitions, with the new partition plan or the original partition plan, the partition being monitored by the detector 603 in which the memory space is exhausted in the heap memory of the Java virtual machine. The partition-based apparatus 600 for diagnosing memory leaks in Java systems in this embodiment and the components thereof can be implemented with semiconductors such as very large scale integration (VLSI) or gate arrays, such as logical chips, transistors; or with hardware circuits for programmable hardware devices such as field programmable gate array (FPGA), programmable logic devices (PLD); or by software executed by processors of various types; or by a combination of the above-mentioned hardware circuits and software. The partition-based apparatus 600 for diagnosing memory leaks in Java systems in this embodiment is operative to implement the partition-based method for diagnosing memory leaks in Java systems in the embodiment shown in FIG. 2.

It can be seen from the above that, using the partition-based apparatus 600 for diagnosing memory leaks in Java systems in this embodiment, since the heap memory of the Java virtual machine is partitioned and it is monitored whether the memory exhaustion occurs in partitions, it is straightforward and fast to diagnose a memory leak, and it prevents the Java system from crashing due to a memory leak. Furthermore, it may further analyze the source code of the application to determine the source code segments related to the memory leak in the source code so as to facilitate the user to repair source code in the application causing the memory leak.

Although the partition-based method and apparatus for diagnosing memory leak in Java systems of the present invention are described in detail with the concrete embodiments hereinabove, the present invention is not limited to the above. The present invention may be varied, replaced or modified without departing from the scope of the invention as set forth in the appended claims.

The invention claimed is:

1. A partition-based method for a computer having at least one processor for diagnosing a memory leak in a Java system, comprising the at least one processor executing steps of:
   at application start-up, obtaining a partition plan comprising a profile defining partition owners and partition sizes and dividing a heap memory of a Java virtual machine into a plurality of partitions based on the partition plan, wherein each partition has at least one partition owner;
   during application execution, monitoring the status of each partition to determine whether there is a partition in which memory space is exhausted; and
   if there is a partition in which the memory space is exhausted, determining that a memory leak may occur in the partition and analyzing the partition to obtain leaked objects and objects related to the leaked objects and analyzing source code of an application according to obtained leaked objects and objects related to the leaked objects to acquire the code segments related to the memory leak, wherein analyzing the source code of an application comprises:
   according to the obtained leak objects and the objects related to the leaked objects, tracking variables which reference the objects in the source code to identify potential leaking references;
   extracting reference patterns of the identified potential leaking references to obtain a leaking reference which is determined as the source of memory leak; and
   tracking a visit command of the leaking reference which is determined as the source of memory leak to determine a correct position where a release statement for releasing the leaking reference is added.

2. The partition-based method for diagnosing a memory leak in a Java system of claim 1, wherein the partition plan is generated by the steps of:
   defining partitions according to a logic structure of an application to obtain the partition owners; and
   determining sizes of the partitions according to behaviors of the obtained partition owners.

3. The partition-based method for diagnosing a memory leak in a Java system of claim 1, wherein the partition plan is generated by the steps of:
   performing escape analysis on source code of an application to obtain potential relations among all objects in the source code;
   calculating distances between every two objects according to a result of the escape analysis;
   clustering all the objects into a plurality of groups according to the calculated distances, wherein each group is corresponding to a partition; and
   determining partition owners and size of each partition.

4. The partition-based method for diagnosing a memory leak in a Java system of claim 1, wherein the detecting step comprises:
   detecting whether an OutOfMemoryError signal occurs in respective partitions; and
   if an OutOfMemory signal occurs in a partition, determining that the memory space in the partition is exhausted.

5. The partition-based method for diagnosing a memory leak in a Java system of claim 1, further comprising:
   deciding whether repartitioning is needed according to the result of analyzing the source code;
   if repartitioning is needed, generating a new partition plan or keeping the original partition plan unchanged; and
   performing the steps of partitioning, partition status monitoring, partition analyzing, and source code analyzing on heap memory or the partition being monitored in which the memory space is exhausted, according to one of the new partition plan and the unchanged original partition plan.

6. The partition-based method for diagnosing a memory leak in a Java system of claim 5, wherein the step of generating a new partition plan comprises:
   combining partitions except the partition being detected in which the memory space is exhausted to one partition; and analyzing source code corresponding to the partition in which the memory space is exhausted to generate a partition plan of the partition in which the memory space is exhausted.

7. A partition-based apparatus for diagnosing a memory leak in a Java system, comprising:
at least one processor for executing units;
a partitioning unit for, at application startup, obtaining a partition plan comprising a profile defining partition owners and partition sizes and dividing a heap memory of a Java virtual machine into a plurality of partitions based on the partition plan, wherein each partition has at least one partition owner;
a detector unit for monitoring status of respective partitions during application execution to determine whether there is a partition in which memory space is exhausted; and
a partition analyzer unit for analyzing the partition in which the memory space is exhausted to obtain leaked objects and objects related to the leaked objects; and
a source code analyzer for analyzing source code of an application according to obtained leaked objects and objects related to the leaked objects to acquire code segments related to the memory leak, wherein the source code analyzer comprises:
a variable tracking unit for, according to the obtained leaked objects and the objects related to the leaked objects, tracking variables which reference objects in the source code to identify potential leaking references;
an extracting unit for extracting reference patterns of the identified potential leaking references to obtain a leaking reference which is determined as the source of memory leak; and
a source code repairing unit for tracking a visit command of the leaking reference which is determined as the source of memory leak to determine a correct position where a release statement for releasing the leaking reference is added.

8. The partition-based apparatus for diagnosing a memory leak in a Java system of claim 7, further comprising: a partition plan generator for generating the partition plan for provision to the partitioning unit.

9. The partition-based apparatus for diagnosing a memory leak in a Java system of claim 8, wherein the partition plan generator comprises:

a partition definition unit for defining partitions according to a logic structure of an application to obtain partition owners; and
a partition size determination unit for determining sizes of the partitions according to behaviors of the obtained partition owners.

10. The partition-based apparatus for diagnosing a memory leak in a Java system of claim 8, wherein the partition plan generator comprises:
an object escape analyzer for performing escape analysis on source code of an application to obtain potential relations among all the objects in the source code;
a distance calculation unit for calculating distances between every two objects according to results of the escape analysis;
a clustering unit for clustering all objects into a plurality of groups according to the calculated distances, wherein each group corresponds to a partition; and
a determination unit for determining a partition owner and size of each partition.

11. The partition-based apparatus for diagnosing a memory leak in a Java system of claim 7, wherein the detector determines whether the memory space in a partition is exhausted by detecting an OutOfMemoryError signal.

12. The partition-based apparatus for diagnosing a memory leak in a Java system of claim 7, further comprising:
a decision unit for deciding whether repartitioning is needed according to the result of analyzing the source code; and
a combination unit for combining partitions, except the partition being monitored in which the memory space is exhausted, to one partition if the decision result of the decision unit is that repartitioning is needed;
wherein in case that the decision result of the decision unit is that repartitioning is needed, the partition plan generator generates a new partition plan for the partition in which the memory space is exhausted or keeps the original partition plan unchanged and provides it to the partitioning unit;
the partitioning unit repartitions the partition in which the memory space is exhausted using one of the new partition plan and the unchanged original partition plan.

* * * * *